United States Patent [19]

Lathan

[11] 4,096,525
[45] Jun. 20, 1978

[54] VIDEO SCANNING CHANGE DISCRIMINATOR

[76] Inventor: William James Lathan, P. O. Box 2785, Grand Junction, Colo. 81501

[21] Appl. No.: 702,390

[22] Filed: Jul. 6, 1976

Related U.S. Application Data

[63] Continuation-in-part of Ser. No. 665,155, Mar. 8, 1976, abandoned, and Ser. No. 434,014, Jan. 17, 1974, abandoned, said Ser. No. 665,155, is a continuation of Ser. No. 509,003, Sep. 25, 1974, abandoned.

[51] Int. Cl.² .............................................. H04N 7/18
[52] U.S. Cl. .................... 358/107; 358/105; 358/136
[58] Field of Search ..................... 358/105, 107, 136

[56] References Cited

U.S. PATENT DOCUMENTS 3,890,462  6/1975  Limb .................................... 358/105

Primary Examiner—Robert L. Griffin
Assistant Examiner—Edward L. Coles

Attorney, Agent, or Firm—Finnegan, Henderson, Farabow & Garrett

[57] ABSTRACT

A method and apparatus is disclosed for determining the speed and direction and height/width dimensions of subject movement within a field of view. Two video frames are compared such that the dimensions of change within the two frames are determined, sorted and counted. One count is made of the vertically-occurring change; the other count is made of the horizontally-occurring change. The derived change dimensions and position is stored to be later compared with the change dimensions and position of a following comparison of two scans; the lateral displacement of one change position of a prior time with respect to the change position of the present time is determined and counted, the count representing the magnitude and direction of the subject movement that occurred. These determinors are 'dumped' into a computer which detects certain types of change and ignores others and which may be operated to determine the velocity of horizontal movement as well as changes in velocity of vertical movement.

7 Claims, 2 Drawing Figures

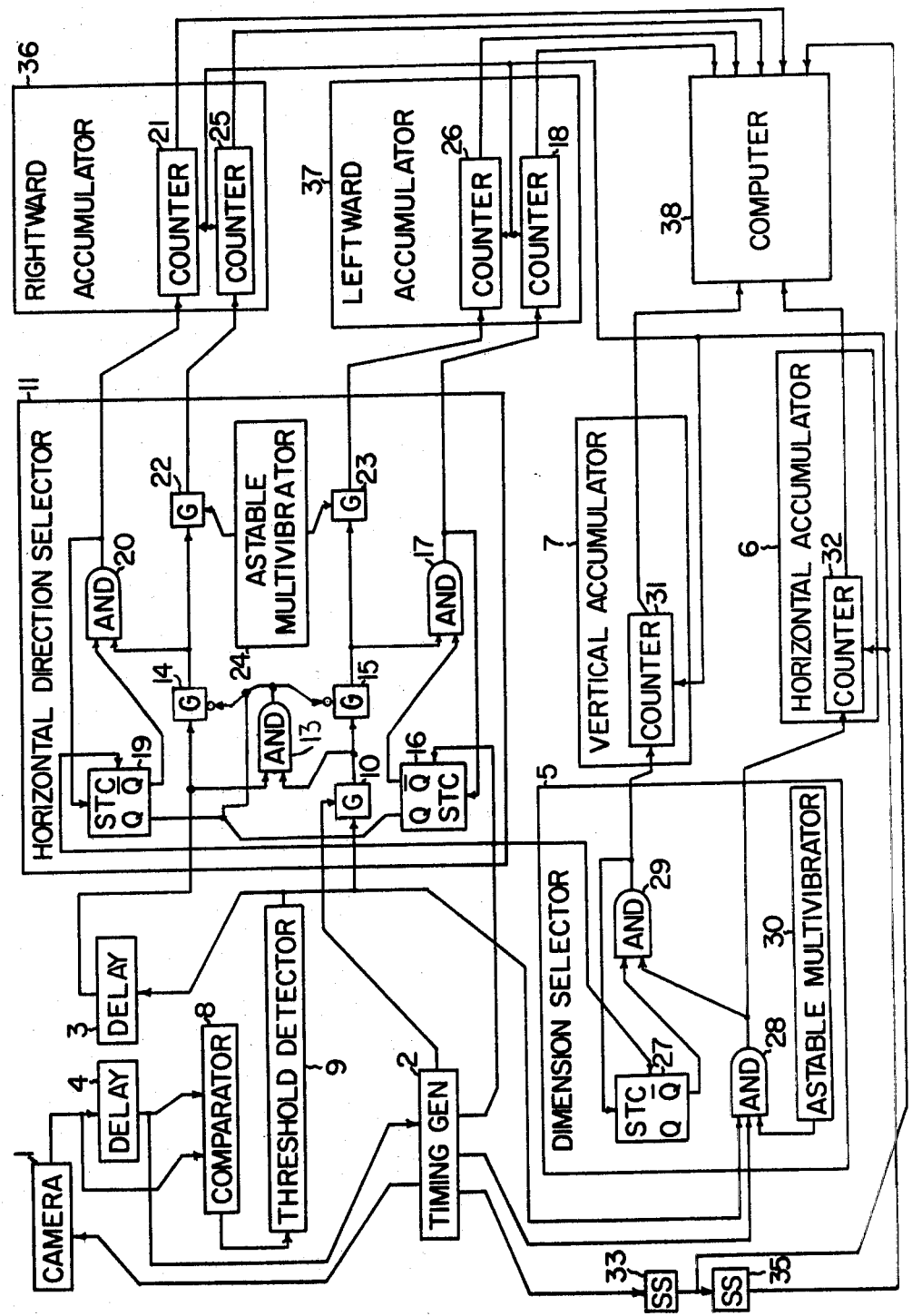

VIDEO SCANNING CHANGE DISCRIMINATOR

RELATED APPLICATIONS

This application is a continuation-in-part of my prior copending applications for Video Scanning Change Discriminator, filed Jan. 17, 1974, Ser. No. 434,014 and Object Change Discriminator, filed Mar. 8, 1976, Ser. No. 665,155, this latter case being a continuation of Ser. No. 509,003 filed Sept. 25, 1974, all of which are abandoned.

BACKGROUND OF THE INVENTION

This invention relates to video systems and, more particularly, to a method and means for deriving from video signals, a set of second signals indicative of the characteristics of dynamic changes taking place in a second area and determining change, speed and direction.

The improvement disclosed herein, lies in the selectors and counters which sum certain characteristics of change found in two to four video frames. The prior art methodology of determining change within two video frames is with the combination of camera, delay, comparator and timing generator. This invention discloses additional novel functions to the combination. A dimension selector is added. The selector selects and sorts vertical change from horizontal change and the associated accumulators sum the vertical change as distinct from the horizontal change. additionally, a horizontal direction selector is disclosed, the later selector determines the direction and magnitude of the change, the connected counters sum leftward movement as distinct from rightward movement. At the proper time, these sums are 'dumped' into a computer.

No prior art reveals a height/width determiner, derived from a moving subject. Prior art speed and direction determiners derive speed and direction through a differing process. In the prior art system, a wave comparator compares the centerline scan of one period of time with successive "skewed" lines of a different scan to find one line that matches the amount of "skew" of the matching line, thereby determining the direction and speed of the change or moving object.

SUMMARY OF THE INVENTION

It is, accordingly, an object of the present invention to provide an arrangement for measuring the characteristics of a change, more specifically, the measurement of height width dimensions coupled with lateral speed and direction measurement.

Briefly, in accordance with the present invention, a video camera provides electrical signals representative of the intensity of the field of view. This electrical information is delivered in accordance with the invention, to an arrangement of a delay, a comparator, and a threshold detector which provides the first differential signals. The first differential signal is indicative of the difference between each picture element of the present video frame and the corresponding picture element of the previous frame. The first differential signal is counted and sorted, such that one count is representative of the horizontal dimension of change, the other count being representative of the magnitude of the vertical dimension. Additionally, the first differential signal, also designating position of change, is delayed and later compared with the position of the change of the presently produced first differential signal. The lateral position differences between the two change designations is counted and sorted, such that one count is representative of the magnitude of the rightward displacement and the other count is representative of the magnitude of the leftward displacement. In accordance with a particularly advantageous embodiment of the invention, the same circuitry is used to provide differential signals and previously described processing is utilized to identify the subject displacement by attached computer circuitry.

BRIEF DESCRIPTION OF DRAWINGS

The objects and features of the invention will be more readily appreciated and better understood by reference to the following detailed description which should be considered in conjunction with the accompanying drawings, wherein:

FIG. 2 is a schematic block diagram of the invention.

DETAILED DESCRIPTION

Figure 1:
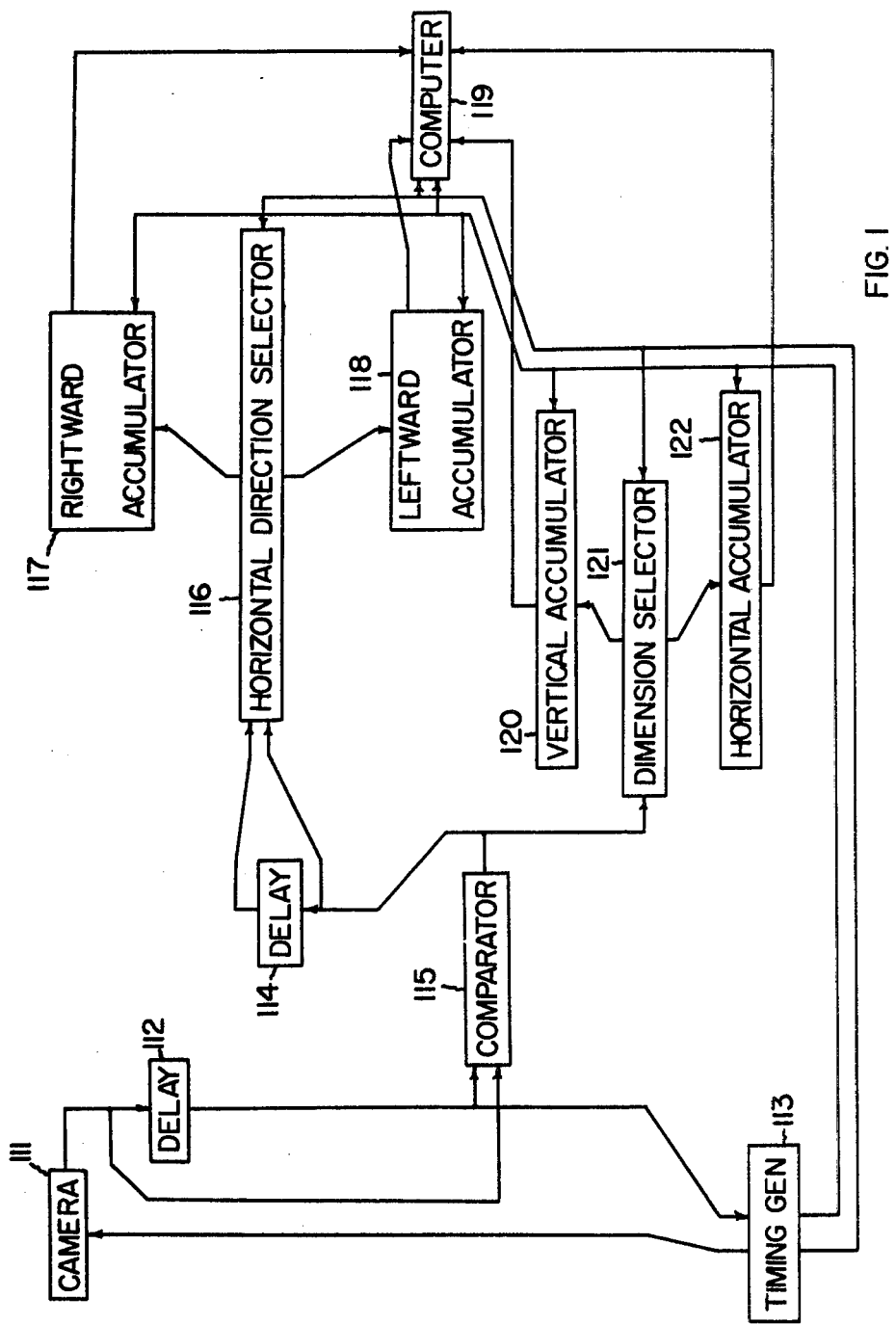
FIG. 1 is a general block diagram in accordance with the present invention.

Referring to the general block diagram of FIG. 1, the combination of the invention is disclosed in relation to the combination of the prior art. The operation of the combination of the prior art is briefly explained as follows. The camera 111 produces electrical signatures of the field of view. One output is supplied to delay 112. Timing generator 113 locks the camera 111 to the output of delay 112 such that as a picture element emerges from delay 112 the corresponding picture element of a common position is produced by the camera 111. The video input and output of the delay 112 is compared by comparator 115, which in the case of sufficient non-comparison, produces a signal of a logical "1" at its output.

The following additional functions are the improvement over the prior art combination. The output of comparator 115 is supplied to dimension selector 121, horizontal direction selector 116 and delay 114. In dimension selector 121 a determination of the vertical dimension as distinct from the horizontal dimension of change is made. The connected vertical accumulator 120 sums the magnitude of vertical change. Similarly, the horizontal accumulator 122 sums the magnitude of the horizontal change.

The derived non-comparison signal from comparator 115 is also applied to delay 114 which is equal to delay 112. The lateral position of the change from a prior frame emerges from delay 114 since the lateral position of change of a present frame is produced by comparator 115. These signals are applied to horizontal direction selector 116 which determines direction of lateral displacement. The magnitude of leftward change is summed in leftward accumulator 118 and the magnitude of rightward change is summed in rightward accumulator 117. Timing generator 113 produces a clock pulse signaling the connected computer 119 to read the counters and shortly thereafter, a clock pulse resets the counters.

Referring to FIG. 2, a detailed description of operation of the system is given. The circuit elements of FIGS. 1 and 2 correspond as follows:

| FIG. 1 | FIG. 2 |
|---|---|
| 111 | 1 |
| 112 | 4 |

-continued

| FIG. 1 | FIG. 2 |
|---|---|
| 113 | 2 |
| 114 | 3 |
| 115 | 8-9 |
| 116 | 11 |
| 117 | 36 |
| 118 | 37 |
| 119 | 38 |
| 120 | 7 |
| 121 | 5 |
| 122 | 6 |

The camera 1 provides electrical information representative of the intensity of the scanned field of view. This electrical information is delivered, in accordance with the invention, to a comparison arrangement comprising a delay 4, a comparator 8, and a threshold device 9. In this case, delay 4 has a storage of many video frames, i.e. $t_1 = (T)(X)$, where $t_1 =$ time delay of delay 4. $T =$ frame period, $X =$ number of frames. Timing generator 2, synchronized to the output of delay 4, provides the time base synchronization, i.e., the field synchronization pulse occurring at time $t_2$, where $t_2 = T/2$, and the line synchronization pulse occurring at time $t_3$, where $t_3 = T/525$, to the camera 1 such as an electrical signature or signal indicative of a presently generated element emerges from the delay 4 the corresponding picture element of the present frame indicative of a common geometric location is produced by the camera 1. comparator circuit 8 utilizes the simultaneous input and output signals of delay 4 to produce a differential signal indicative of change of intensity of brightness of each picture element of the present video frame with respect to the corresponding picture element of a previous video frame. This differential signal is applied to the threshold detector 9 which provides a first differential output indication signal, a logical "1" signal, each time the amplitude of difference exceeds a predetermined threshold. The signals from detector 9 supply dimension selector 5 with one input to the three input AND gate 28. Similarly, astable multivibrator 30 produces a clocked input for AND gate 28. As a third input to AND gate 28, timing generator 2, after an initial delay equal to time $t_1$, provides a logical "1" output, allowing gate 28 to be enabled only when both instantaneous and delayed video values are present. The clocked output of AND gate 28 is applied to counter 32 of horizontal change accumulator 6, which accumulates the clock pulses indicative of the length and duration of change. It should be readily apparent that with horizontal lines of scan, the comparator 8 produces, horizontally, first differential signals of the field of view. Therefore counter 32 sums the horizontal dimensions of change. The clock pulse, $t_3$, coinciding with the end of each scan video line, is provided by the timing generator 2 to reset flip-flop 27, in every case setting output $\overline{Q}$ at a logical "1". The output thereof, is applied to one input of two input AND gate 29. Following the reset pulse and the occurrence of a first differential change indication, a logical "1" pulse from AND gate 28, the output of AND gate 29 provides a through path for the pulse. The connected flip-flop 27, in response to the trailing edge of the pulse, shifts logical "0" to output $\overline{Q}$. The output thereof is applied to one input of AND gate 29, the latter producing in a negative transition, an output signal of a logical "0". As a consequence to this negative transition of gate 29 the connected counter 31 in the vertical change accumulator 7 is clocked one. It should now be clear that AND gate 29 cannot produce additional negative transitions, without resetting the output $\overline{Q}$ of flip-flop 27 to a logical "1". The reset pulse occurs at the end of each line of scan at time $t_3$, allowing only one change count per scan line. Because each present line of scan is vertically displaced from the prior line, the accumulation of vertical change accumulator 7 of each line of scan with a first differential signal indicative of change, is representative of the vertical length of change.

In speed and direction determination, the horizontal direction selector circuitry 11 compares the lateral position of a first differential change indication of a prior comparison with respect to the lateral position of the first differential signal change indication of the present comparison of an additional two video scans. As set forth, the stored designation of prior change is recalled from delay 3, which, in any case, is equal to delay 4, i.e., $t_1 = (T)(X)$. The storage time of delay 3, equal to time $t_1$, is such that as a first differential signal, indicative of differences of presently compared picture elements, is produced, the corresponding derived first differential signal of previously compared picture elements indicative of a common geometric location emerge from the delay 3. After an initial time delay equal to twice the period of delay 3, i.e., $t_4 = 2t_1$, timing generator 2 provides a logical "1" signal which closes hereinafter called an "enhance mode gate." Hence the present first differential signal as well as a previous first differential signal are simultaneously applied as inputs to AND gate 13; in absence of a first differential change indication, such that a logical "1" is not present at both inputs, the output of AND 13 is a logical "0". As a consequence, the connected gates 14 and 15, hereinafter called "dehancement mode gates", are closed such that signals presented at their respective inputs are passed through to their outputs. Gates 10, 22, and 23 are conventional logical switching elements which provide a through path for the input signal when a logical "1" is applied to the gating control input line and block the input signal when "0" is applied to the control input. Gates 14 and 15 are similar circuits but have inverting elements at their control inputs (designated by the symbol "o"). Thus gates 14 and 15 are "closed" (pass the input signal) in response to a "0" gating input and are "opened" (block the input signal) in response to a "1" gating input.

In camera 1, scanning from left to right, picture elements and first differential signals are produced and compared likewise from left to right and a previous element of the same line is always leftward of the present element. It follows that in comparing the present first differential signal (i.e., the signal at the output of enhance mode gate 10) with the previous first differential signal (i.e., the signal from delay 3), the direction of movement can be detected by determining which of the two signals comes up first. If the previous first differential signal comes up first, the direction of movement is rightward and if the present first differential signal comes up first, the direction of movement is leftward.

The direction determination is made in the horizontal direction selector 11.

Now referring to the circuitry of the selector 11, at the end of each video line a clock pulse, $t_3$, representing the end of the line period, from timing generator 2, is applied to the reset of flip-flops 16 and 19, thereby providing a logical "1" at the reset outputs $\overline{Q}$ which are connected respectively to one input of AND gate 17 and AND gate 20. Accordingly, on the occurrence of leftward subject movement, a first change designation, a logical "1" is encountered first in the presently produced first differential signal which is applied to both one input of AND gate 13 and to the input of gate 15. However, the other input to AND gate 13, as well as its output, remains a logical "0". Accordingly dehancement mode gate 15 remains closed providing a through path to the first (present) differential signal to the gating control input of enhancement mode gate 23 and to AND 17. A first differential indication signal of a logical "1" to gate 23 provides a through path for pulses supplied by astable multivibrator 24 to counter 26 of leftward accumulator 37. The pulses are accumulated until the secondly encountered first differential indication signal, a logical "1" emerges from delay 3 and is applied to AND gate 13. Now the two logical "1" signal inputs to AND gate 13 drive the output thereof to a "1". As a result dehancement mode gate 15 is opened, blocking the change indication from AND gate 17 and enhancement mode gate 23. Accordingly, counter 26 is now isolated from the astable multivibrator 24 and the output of AND gate 17, in a negative transition, becomes a logical "0". The negative transition of AND gate 17 toggles connected flip-flop 16 and simultaneously increments counter 18 of leftward change accumulator 37. In response to the toggle, reset output $\overline{Q}$ of flip-flop 16, which is one input to AND gate 17, becomes a logical "0". The remaining set output Q of flip-flop 16, after being toggled, becomes a logical "1", which, as a gate signal, opens both dehancement mode gate 14 and gate 15. It should be clear that no further counting is possible until flip-flop 16 is reset by the timing generator 2, at the end of each video scan line. For rightward movement, the selector circuit 11 is symmetrical to the one described in leftward movement. The differing factor in rightward movement is that the value "1" is first encountered in the signal from delay 3, rather than first encountered in the signal from threshold detector 9, as in the case of leftward movement. At the end of the frame, the vertical pulse i.e., $t_2 = T/2$, triggers the trailing edge sensitive single shot 33 which signals a computer system 38 to read the counters. When the single shot 33 collapses, the trailing edge triggers single shot 35, preclearing all counters.

It is thus seen that during each video frame interval counter 25 accumulates a count which is proportional to the rightward distance travelled by the trailing edge of the moving object during the time of delay 3 (i.e., $t_1$). In the event of leftward movement, counter 26 accumulates a count proportional to the leftward distance travelled by the leading edge of the object during $t_1$. The counts thus represent both direction and magnitude of movement and, since $t_1$ is constant, can be used to determine velocity of movement by means of the formula $X/t_1$, where X represents a given count. Computer 38 may be used to perform such calculation, it being fully within the skill of the ordinary computer programmer to implement the indicated division operation using any known type of computer.

Counters 18 and 21 accumulate counts Y representing the number of scan lines in each frame for which horizontal movement is detected. This is an indication of the sum of the vertical dimension of the moving object and the vertical distance travelled during $t_1$. Since the vertical dimension of the object remains substantially constant, variations in the difference $\Delta Y$ between successive counts $Y_i$ and $Y_{i+1}$ represent changes in the vertical velocity of the moving object relative to the video frame. Computer 38 may thus be operated in accordance with well known techniques to calculate successive $\Delta Y$ values and to determine velocity variations from such values.

ALTERNATE EMBODIMENTS

It should be understood that the methodology underlining the embodiments described above could be utilized with substantial variations and for different purposes. This is so as the number of scans can be varied from a minimum of three scans to a maximum of four scans in a complete cycle of operation.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A system for analyzing video signals representing a field of view, comprising, in combination:
    means for supplying video signal data representing sequentially occurring video frames, each said frame including a plurality of horizontal scan signals;
    comparison means for synchronously comparing horizontal scan signals from a first video frame with horizontal scan signals representing like-positioned scan lines from a later-occurring video frame to generate a sequence of differential signals representing changes in said video data occurring along the scan-line positions of said horizontal scan signals, said changes indicating movement of an object in said field of view;
    storage means for storing said differential signals; and
    direction sensing means synchronously responsive to a first differential signal prior to storage representing changes occurring along a given scan line position and to a second previously generated differential signal, received from said storage means, representing changes previously occurring along the same scan line position, said direction sensing means including means for detecting the relative time of occurrence of change-representative data in said two differential signals, means for providing an indication of rightward movement of said object when the first-detected change-representative data occurs in said second differential signal, and means for providing an indication of leftward movement of said object when the first-detected change-representative data occurs in said first differential signal.

2. The system set forth in claim 1 further comprising:
    horizontal detection means for determining and indicating the duration between the time of occurrence of said first-detected change-representative data in one of said differential signals and the time of occurrence of the first change-representative data occurring in the other of said differential signals, whereby a measure of the horizontal distance moved by said object is obtained.

3. The system set forth in claim 2 further comprising:
    vertical detection means for determining the number of differential signals for each video frame in which change-representative data is detected, whereaby a measure of the sum of the vertical dimension of said object and the vertical distance moved thereby is obtained.

4. The system set forth inclaim in claim wherein said storage means comprises a constant-interval delay circuit and wherein said system further comprises:
   computing means for dividing the time duration indicated by said horizontal detection means by the delay interval of said constant interval delay circuit to obtain a measure of the velocity of horizontal movement of said object.

5. The system set forth in claim 1 wherein said means for detecting the relative time of occurrence of said change-representative data comprises:
   first and second gating circuits receiving, respectively, said first and second differential signals;
   bistable circuit means having mutually exclusive set and reset outputs, said set output being connected to control said first and second gating circuits to block said differential signals;
   a pair of first two-input coincidence circuits, the first of said inputs being connected, respectively, to the outputs of said first and second gating circuits and the other of said inputs being connected to the reset output of said bistable circuit means, the outputs of said coincidence circuits being connected to an input of said bistable circuit means to activate the set output thereof;
   timing means for resetting said bistable circuit means just prior to commencement of said differential signals whereby said gating circuits are conditioned to pass said differential signals;
   a second two-input coincidence circuit connected to the inputs of said first and second gating circuits for generating a coincidence output when change-representative data is simultaneously present in both of said differential signals, the output of said coincidence circuit being supplied to control said first and second gating circuits to block said differential signals;
   third and fourth circuits connected, respectively, to the outputs of said first and second gating circuits; and
   multivibrator means connected to supply a train of pulses to said third and fourth gating circuits, whereby when the first-detected change-representative data occurs in said first differential signal said third gating circuit is activated by said change-representative data to pass a train of pulses indicating leftward movement of said object and when the first-detected change-representative data occurs in said second differential signal said fourth gating circuit is activated by said change-representative data to pass a train of pulses indicating rightward movement of said object, said system further operating such that the later occurrence of change-representative data in the opposite differential signal activates the set output of said bistable circuit means to block said differential signals and terminate said direction-indicating train of pulses.

6. The system set forth in claim 5 further comprising:
   first counting means for counting the number of pulses in the train of pulses passed by said third gating circuit during each video frame cycle; and
   second counting means for counting the number of pulses in the train of pulses passed by said fourth gating circuit during each video frame cycle, the count in said first counting means being an indication of the leftward horizontal distance moved by said object and the count in said second counting means being an indication of the rightward horizontal distance moved by said object.

7. The system set forth in claim 6 further comprising:
   third counting means for counting the number of times the set output of said bistable circuit means is activated during each video frame cycle, the count in said third counting means representing a measure of the sum of the vertical dimension of said object and the vertical distance moved thereby.

* * * * *

UNITED STATES PATENT OFFICE
CERTIFICATE OF CORRECTION

Patent No. 4,096,525    Dated    June 20, 1978

Inventor(s)    William James Lathan

It is certified that error appears in the above-identified patent and that said Letters Patent are hereby corrected as shown below:

| | | |
|---|---|---|
| Column 4, | line 26, | after "closes" insert --gate 10,--. |
| Column 6, | line 67, | change "whereaby" to --whereby--. |
| Column 7, | line 3, | delete "inclaim"; |
| | line 3, | after "claim" insert --2--. |
| Column 8, | line 1, | after "fourth" insert --gating--. |

Signed and Sealed this

Twentieth Day of March 1979

[SEAL]

Attest:

RUTH C. MASON
Attesting Officer

DONALD W. BANNER
Commissioner of Patents and Trademarks